(12) United States Patent
Lu (10) Patent No.: US 7,906,885 B2
(45) Date of Patent: *Mar. 15, 2011

(54) BRUSHLESS ELECTRIC MACHINE

(75) Inventor: Weiting Lu, Tainan (TW)

(73) Assignees: Union Plastic (Hangzhou) Machinery Co., Ltd., Zhejiang (CN); Hsiaoting Lu, Tainan (TW); Weiting Lu, Tainan (TW)

( * ) Notice: Subject to any disclaimer, the term of this patent is extended or adjusted under 35 U.S.C. 154(b) by 269 days.

This patent is subject to a terminal disclaimer.

(21) Appl. No.: 11/916,996

(22) PCT Filed: Jun. 28, 2006

(86) PCT No.: PCT/CN2006/001478
§ 371 (c)(1),
(2), (4) Date: Dec. 3, 2008

(87) PCT Pub. No.: WO2007/000114
PCT Pub. Date: Jan. 4, 2007

(65) Prior Publication Data
US 2009/0102305 A1  Apr. 23, 2009

(30) Foreign Application Priority Data
Jun. 29, 2005  (CN) .......................... 2005 1 0035656

(51) Int. Cl.
H02K 1/00 (2006.01)
H02K 21/12 (2006.01)
(52) U.S. Cl. ............. 310/216.079; 310/156.32; 310/266
(58) Field of Classification Search ............. 310/156.02, 310/156.32–156.39, 216.074, 216.079, 265–266
See application file for complete search history.

(56) References Cited

U.S. PATENT DOCUMENTS 6,891,306 B1 * 5/2005 Soghomonian et al. .......................... 310/216.092
7,755,244 B2 * 7/2010 Ley et al. ............... 310/216.019

* cited by examiner

*Primary Examiner* — Quyen Leung
*Assistant Examiner* — Leda Pham

(57) ABSTRACT

A brushless electric machine includes a rotor and a stator. Each of the twin poles of the stator electromagnetic members corresponds to one of the two magnetic poles of the rotor magnetic assembles. Two radial component air-gaps are arranged between the stator and the rotor to separate the stator and the rotor. Axial component air-gaps axially corresponding are arranged between the stator poles and the corresponding rotor poles to separate the stator poles and the rotor poles. The stator wheel-shaped ring is partly surrounded by the rotor wheel-shaped ring.

19 Claims, 11 Drawing Sheets

BRUSHLESS ELECTRIC MACHINE

BACKGROUND OF THE INVENTION

1. Field of the Invention

The present invention relates to a brushless electric machine having a plurality of flux loops and, more particularly, to a brushless electric machine including a stator having a plurality of magnetically isolated stator elements for interacting with a plurality of rotor elements having permanent magnets.

2. Description of the Related Art

Most early designs of electric machines utilized an end of a ferromagnetic member to create torque, which merely utilized half potential of electric machines. Current rotary electric machines utilize two ends of a winding to provide a larger effective air-gap surface area between the rotor and the stator for the purposes of creating the torque of the electric machines. However, adjacent magnetic poles adversely affect concentration of flux in the structure of conventional general-purpose electric machines and result in undesired transformer interference effect.

U.S. Pat. No. 6,791,222 to Maslov et al. discloses a rotary electric machine utilizing two ends of a winding to increase the air-gap surface area between the rotor and the stator. The transformer interference effect resulting from the flux between adjacent windings is eliminated by isolating pole pairs from one another. The stator of such a D.C. electric machine includes a plurality of ferromagnetically isolated electromagnets. The axially aligned rotor magnets and the stator poles provide concentrated flux that can be focused on a relatively large surface to produce high torque. Furthermore, a sensor detects relative position between the rotor and the stator for optimally controlling winding current on the electromagnets at different times, thereby allowing smooth operation of the electric machine.

In U.S. Pat. No. 6,891,306 Maslov et al. improves the structure of the above-mentioned electric machine to obtain larger overall effective air-gap surface area. By increasing the surface areas of the stator poles and the rotor magnets and through improved flux distribution resulting from concentration of flux, larger flux distribution is provided. Thus, the electric machine provides larger continuous flux-producing paths between the rotor elements and stator elements. By increasing the surface area between the rotor poles and the corresponding stator poles extending through a plurality of air-gaps, flux can be focused on a relative larger surface to further increase the torque of the electric machine. In the two electric machines mentioned above, the interaction of the electromagnetic forces is in the axial direction such that axial imbalance will result in adverse affect to the electric machines. In practice, the spatial arrangement of the windings must be considered before operation to achieve geometrically radial balance in space, which, in operation, is achieved by simultaneously controlling the associated windings. In this case, operation of all of the associated windings must be stopped to maintain the geometric balance even though only one of the associated windings malfunctions. This not only reduces flexible operating characteristics of the electric machines but also increases the torque ripple.

The present invention is intended to reduce adverse affects to the electric machine when axial imbalance occurs and to enhance the flux distribution of the poles such that the flux can be focused on a larger pole face, thereby enhancing efficiency and output of the electric machine while lowering torque pulsation and maintaining safe, flexible operating characteristics.

SUMMARY OF THE INVENTION

An objective of the present invention is to provide a brushless electric machine with high efficiency and high output while lowering torque pulsation and providing safe, flexible operating characteristics during operation of the electric machine.

To attain the above objective, the present invention provides a brushless electric machine in which the interaction of the electromagnetic forces is in the axial direction. Furthermore, the surface area of the rotor poles and the corresponding stator poles extending through the air-gaps is increased to further increase the torque capacity of the brushless electric machine. Geometrical, spatial balance is obtained in the brushless electric machine in addition to attaining high-efficiency, high-torque output as well as lowering torque pulsation and improving safe, flexible operating characteristics. The above demands can be attained by at least a portion of the structure of the brushless electric machine in accordance with the present invention.

A first embodiment of the present invention includes a brushless electric machine having a stator and a rotor. The rotor includes a plurality of magnetic elements each having two permanent magnets with opposite magnetic polarities. The plurality of magnetic elements successively alternate in polarities (N/S) along a circumferential direction about a revolving shaft to form a wheel-shaped ring, with adjacent permanent magnets arranged along the circumferential direction about the revolving shaft being spaced by a gap. Furthermore, each permanent magnet of each magnetic element of the rotor is a thin, planar permanent dipole magnet. Each magnetic element with permanent magnets of the rotor includes a substantially U-shaped coupling seat made of ferromagnetic material. Two permanent magnets are respectively mounted to inner faces of two lateral walls of the U-shaped coupling seat of each magnetic element and form two magnetic poles of the magnetic element. Each permanent magnetic pole face faces one of two radial component air-gaps. A face of a permanent magnet of each magnetic element facing an air-gap exhibits a single magnetic polarity that is opposite to that of the face of the other permanent magnet on the same magnet element, forming a radial magnetic pole. The stator includes at least one electromagnetic member. A plurality of ferromagnetically isolated electromagnetic members of the stator are coaxially arranged about the revolving shaft. Each electromagnetic member has twin poles connected by a ferromagnetic core segment. The pole faces of the twin poles face respective radial component air-gaps. A winding is formed on the core segment of the electromagnetic member. Each winding has an independent switch for energization. Each electromagnetic member of the stator is fixed by non-ferromagnetic structure to the stator such that the electromagnetic members have no ferromagnetic contact therebetween for avoiding transformer interference effect resulting from the flux between adjacent windings. The stator and the rotor are assembled together, with the stator wheel-shaped ring at least partly surrounded by the rotor wheel-shaped ring to define two radial component air-gaps on two radial faces of the rotor and between the rotor and the stator.

The winding of each electromagnetic member of the stator has an independent switch for energization. When a winding is energized, the pole faces of the pole pair of the electromagnetic member produce opposite magnetic polarities. The polarities of the pole pair of the electromagnetic member are reversed when the current in the winding is reversed. The respectively energized pole pairs of the electromagnetic members of the stator separates the rotor magnetic fields enclosed therein and produce an appropriate attractive or repulsive force through reaction with the corresponding permanent magnetic fields of the magnetic elements of the rotor for driving the rotor. Adverse affect resulting from magnetic field interference effect between two adjacent windings is eliminated through mutual separation of the flux paths of the electromagnetic members of the stator. On/off of energizing of the winding can be controlled by a mechanical commutator or an electronic switching circuit. Control of the electronic switching circuit requires detection signal from a sensor.

In a second embodiment of the present invention, through a change, the magnetic pole faces of the two permanent magnets of the magnetic element of the rotor have identical pole face surface area to attain uniform flux distribution at the two permanent magnetic poles of the magnetic element of the rotor. Furthermore, the two pole faces of the pole pair of the electromagnetic member of the stator also have identical pole face surface area such that the flux passing through the two poles of the twin poles of electromagnetic members of the stator is balanced. However, such a change causes adverse affect to the electric machine when every electromagnetic member operates independently. Nevertheless, the adverse affect resulting from geometrical imbalance can be mitigated through serial energization or parallel energization of two windings having a phase-angle difference of 180° in space therebetween.

In a third embodiment of the present invention, to avoid loss of output of the brushless electric machine while considering operational balance of the brushless electric machine, the pole face on the radially inner side of the two magnetic pole faces of the magnetic element of the stator are modified to provide additional axially aligned magnetic pole faces with identical pole face surface area. Furthermore, when the number of the pole faces of the stator pole in the axial direction is even, the number is the same as that of the corresponding rotor pole in the axial direction such that the number of the axial component air-gaps between the radially inner stator pole and the corresponding rotor pole is even. This improvement not only provides the electric machine with two poles with uniform flux distribution but also mitigates the adverse effect resulting from geometrical imbalance.

In a fourth embodiment of the present invention with a further improvement, each of two permanent magnetic poles of the magnetic element of the rotor includes a substantially U-shaped pole face. One of three pole faces of the U-shaped pole face is generally perpendicular to the revolving shaft and faces the radial component air-gap whereas the other two respectively face the axial component air-gaps. Each of the twin poles of the electromagnetic members of the stator includes a substantially U-shaped cross section and is spaced from the corresponding magnetic pole of the magnetic elements by a radial component air-gap and two axial component air-gaps. In addition to two radial component air-gaps between the stator and the rotor for separating the stator from the rotor, each stator pole and the corresponding rotor pole have axially aligned axial component air-gaps from separating the stator from the rotor such that the number of the axial component air-gaps between each stator pole and the corresponding rotor pole is even. By increasing the pole faces of the rotor magnetic pole facing the axial component air-gaps and the pole faces of the corresponding stator pole, additional surface area of the rotor magnetic pole and the corresponding rotor pole extending across the air-gaps is obtained to focus flux on a relatively large surface, thereby enhancing high output capability of the brushless electric machine. Meanwhile, by increasing the axial pole face of the brushless electric machine, the magnetic pole faces of two permanent magnets of the magnetic element have identical pole face surface area whereas the two pole faces of the pole pair of the electromagnetic member have identical pole face surface area, providing additional structural advantages.

Though arrangement of respective independent elements in the structure of the brushless electric machine, geometrical spatial balance of the brushless electric machine is taken care to attain further improvement in safe, flexible operational characteristics. Furthermore, adverse affect to the electric machine during independent operation of a single element is reduced through spatial balanced arrangement of the plurality of electromagnetic members of the stator and the plurality of magnetic elements of the rotor.

In a fifth embodiment of the present invention, the U-shaped permanent magnet of each magnetic pole of the magnetic element of the rotor is replaced with three permanent magnets, with each of two magnetic poles with opposite polarities of each magnetic element still includes three pole faces having identical magnetic polarity. Although such an arrangement causes adverse affect to concentration of the torque-producing flux, preparation of the permanent magnets becomes easier while operation of the brushless electric machine remains unchanged.

In a sixth embodiment of the present invention, considering easy preparation and manufacture of the permanent magnets, the U-shaped permanent magnet of each magnetic pole of the magnetic element of the rotor in the fourth embodiment is replaced with an arc-shaped permanent magnet to provide two radial component air-gaps between the stator and the rotor for separating the stator from the rotor. Furthermore, axially aligned axial component air-gaps are provided between the stator pole and the rotor pole for separating the stator pole from the rotor pole. Although such an arrangement reduces the pole face surface area, operation of the brushless electric machine remains unchanged.

In a seventh embodiment of the present invention with a further improvement, adjacent permanent magnets of the rotor arranged along the circumferential direction about the revolving shaft are not only separated from one another by gaps but also have no ferromagnetic contact therebetween. Thus, a smoother flux distribution is provided on the rotor magnetic pole, attaining concentration of flux, most efficient utilization of flux, and minimization of the transformer interference effect. Highly efficient operation of the brushless electric machine at high output is attained.

By such an arrangement and due to geometrical improvement of the structure of the brushless electric machine, adverse affect resulting from geometrical imbalance can be minimized to attain high-efficient, high-output, and safe, flexible operating characteristics for the brushless electric machine without significantly increasing the space and weight.

Additional advantages of the present invention will become readily apparent to those skilled in the art from the following detailed description and embodying illustration and through thorough consideration of the explanation of the present invention. In practice, the present invention is capable of other and different embodiments, and its several details are capable of modifications in various obvious respects, all without departing from the present invention. Accordingly, the drawings and description are to be regarded as illustrative in nature, and not as restrictive.

INDUSTRIAL APPLICATION

The brushless electric machine in accordance with the present invention is suitable for a highly efficient generator or motor and can be utilized as an engine for driving devices such as electric wheel chairs, electric motorcycles, electric automobiles, etc.

The embodiments of the invention will be described by way of examples in a non-limiting manner with reference to with the accompanying drawings.

NUMBER LIST 21, 22, 22$b$1, 21$c$1, 22$c$1, 21$d$1, 22$d$1 radial component air-gap
21$c$2, 21$c$3, 22$b$2, 22$b$3, 22$c$2, 22$c$3, 21$d$2, 21$d$3, 22$d$2, 22$d$3 axial component air-gap
32 gap between adjacent magnetic elements along a circumferential direction of revolving shaft
33, 33$c$ gap between poles of electromagnetic members
55, 55$a$, 55$b$, 55$c$ coupling seat of magnetic element
51, 52, 51$a$, 52$a$, 52$b$, 51$c$, 52$c$ permanent magnet of magnetic element
51$d$1, 52$d$1 permanent magnet on inner side of coupling seat of magnetic element that faces radial component air-gap
51$d$2, 51$d$3, 52$d$2, 52$d$3 permanent magnet on inner side of coupling seat of magnetic element that faces axial component air-gap
60 electromagnetic member
61, 62, 61$a$, 62$a$, 62$b$, 61$c$, 62$c$ pole pair of electromagnetic member
65, 65$a$1, 65$a$2, 65$e$ winding of electromagnetic member
63 core segment of electromagnetic member
69, 69$b$ coupling seat of electromagnetic member
611$b$, 612$b$ recess in a side of U-shaped pole pair 61 and 62 of electromagnetic member
611, 612 fixing plate
611$a$, 612$a$ radial protrusion of fixing plate 611, 612
611$c$, 612$c$ groove in fixing plate 611, 612

601 fixing post of stator
601$c$1, 601$c$2 hole in fixing post 601
601$a$ fastener
74 revolving shaft
80 rotor disc
81, 81$c$, 81$e$ rotor fixing disc
82, 82$c$ stator fixing disc
83, 83$e$ rotor outer ring

DETAILED DESCRIPTION OF THE PREFERRED EMBODIMENTS

Figure 1:
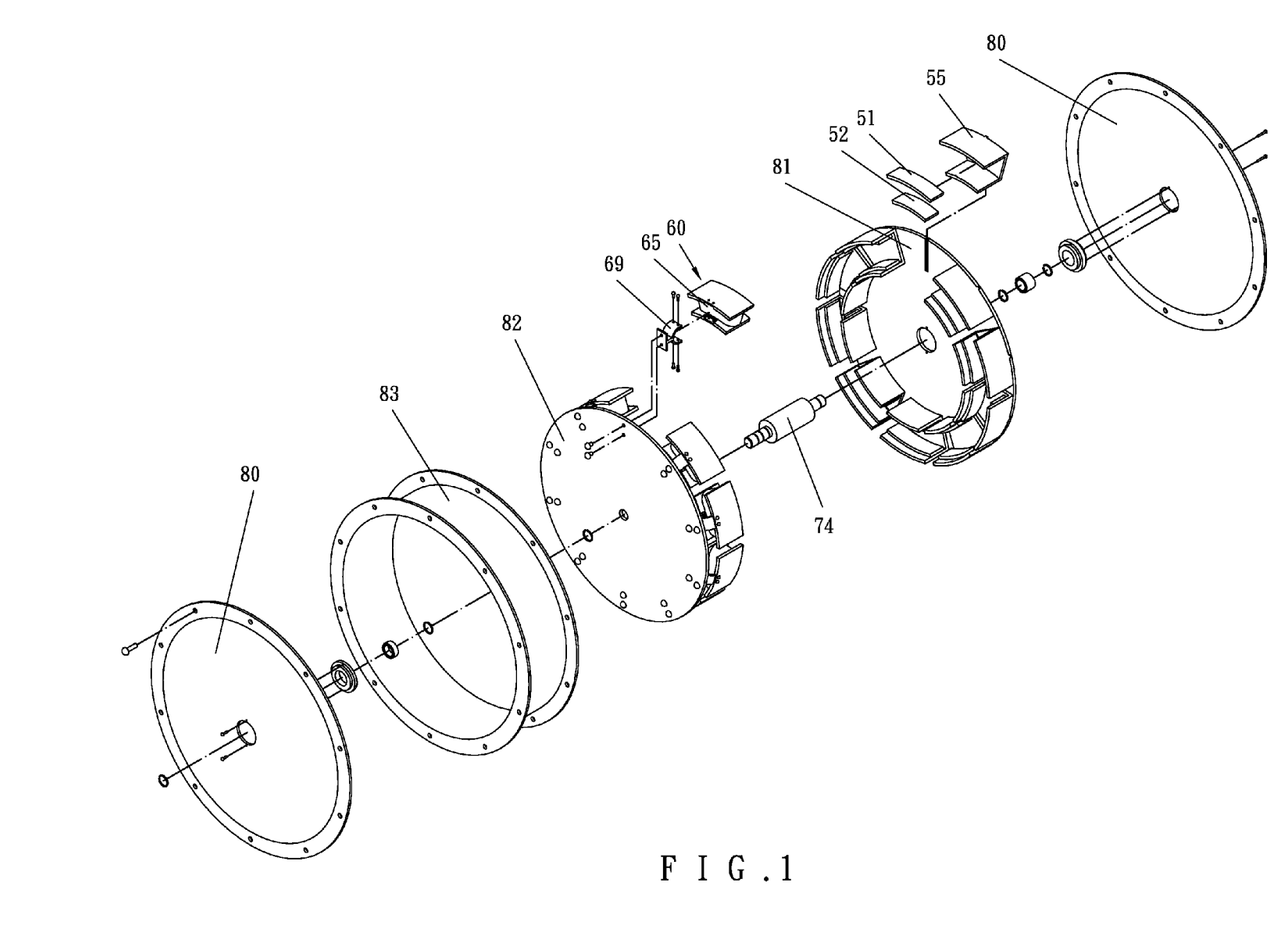
FIG. 1 is an exploded perspective view of a first embodiment of a brushless electric machine in accordance with the present invention.

FIG. 1 is an exploded perspective view illustrating members of a first embodiment of a brushless electric machine in accordance with the present invention. The brushless electric machine in accordance with the present invention includes a stator and a rotor. The rotor includes a plurality of magnetic elements having permanent magnets. Each magnetic element includes a substantially U-shaped coupling seat 55 made of ferromagnetic material. Permanent magnets 51 and 52 are respectively mounted to inner faces of two lateral walls of the U-shaped coupling seat 55 of each magnetic element and form two magnetic poles of the magnetic element. A rear side of the U-shaped coupling seat of each magnetic element is engaged with a rotor fixing disc 81 such that the magnetic elements having permanent magnets are arranged along a circumferential direction about a revolving shaft 74 to form a rotor wheel-shaped ring. The rotor fixing disc 81 is coupled with one of two rotor discs 80. The rotor outer ring 83 is engaged with the rotor discs 80 at two sides and engaged with the revolving shaft via bearings. The stator includes a plurality of electromagnetic members 60. The stator electromagnetic members having windings 65 are coupled to the revolving shaft via coupling seats 69 and a stator fixing disc 82 such that the electromagnetic members are arranged along a circumferential direction about the revolving shaft to form a stator wheel-shaped ring. The stator wheel-shaped ring is at least partly surrounded by the rotor wheel-shaped ring to define two radial component air-gaps on two radial faces of the rotor and between the rotor and the stator. In this case, the number of the axial component air-gaps separating the stator pole and the corresponding rotor pole in the axial section is zero (zero-to-zero axially aligned axial component air-gaps).

Figure 2:
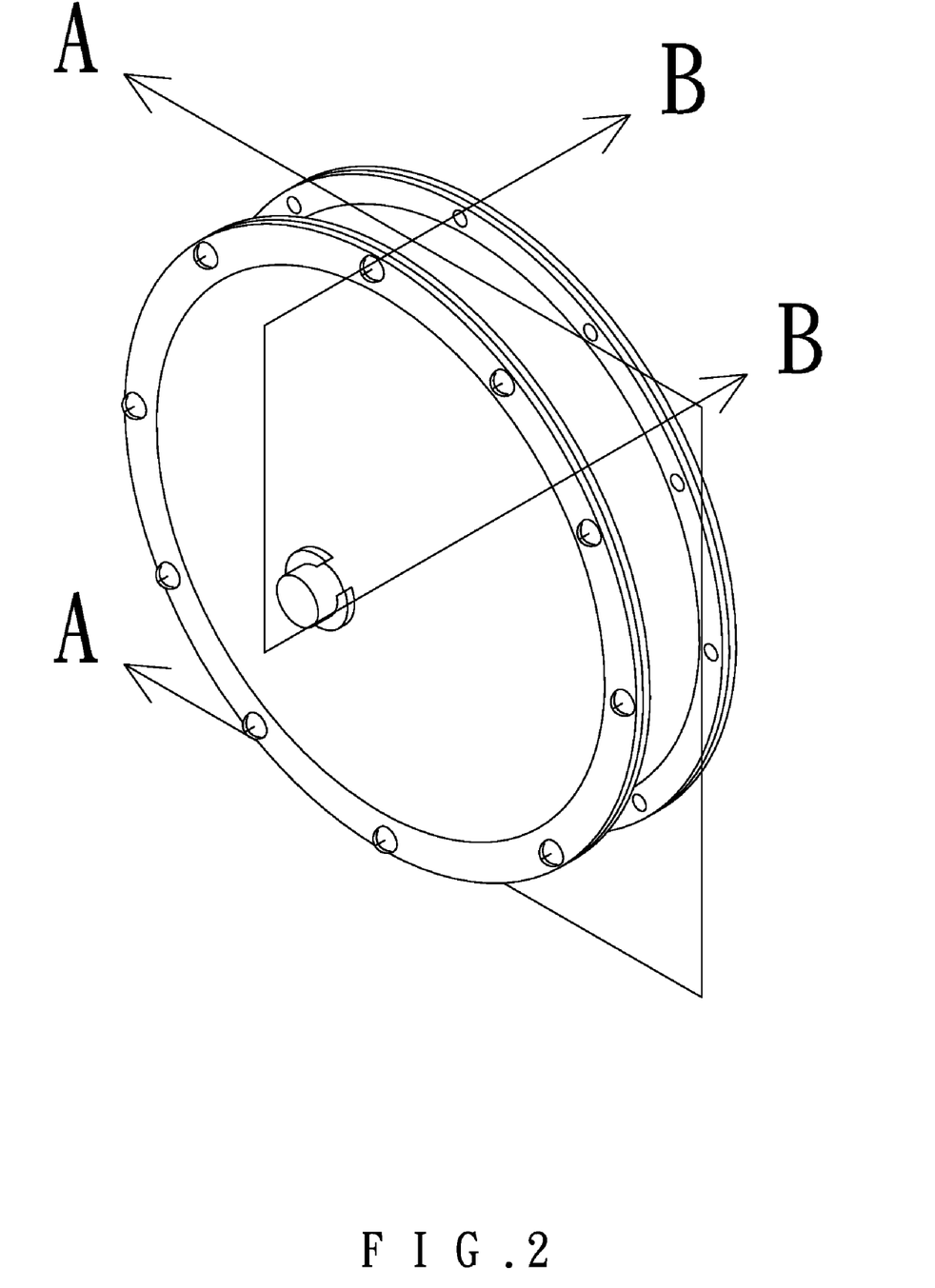
FIG. 2 is a perspective view of the first embodiment of the brushless electric machine in accordance with the present invention after assembly.

FIG. 2 is a perspective view of the first embodiment of the assembled brushless electric machine suitable for driving a device using wheels as transport means.

Figure 3:
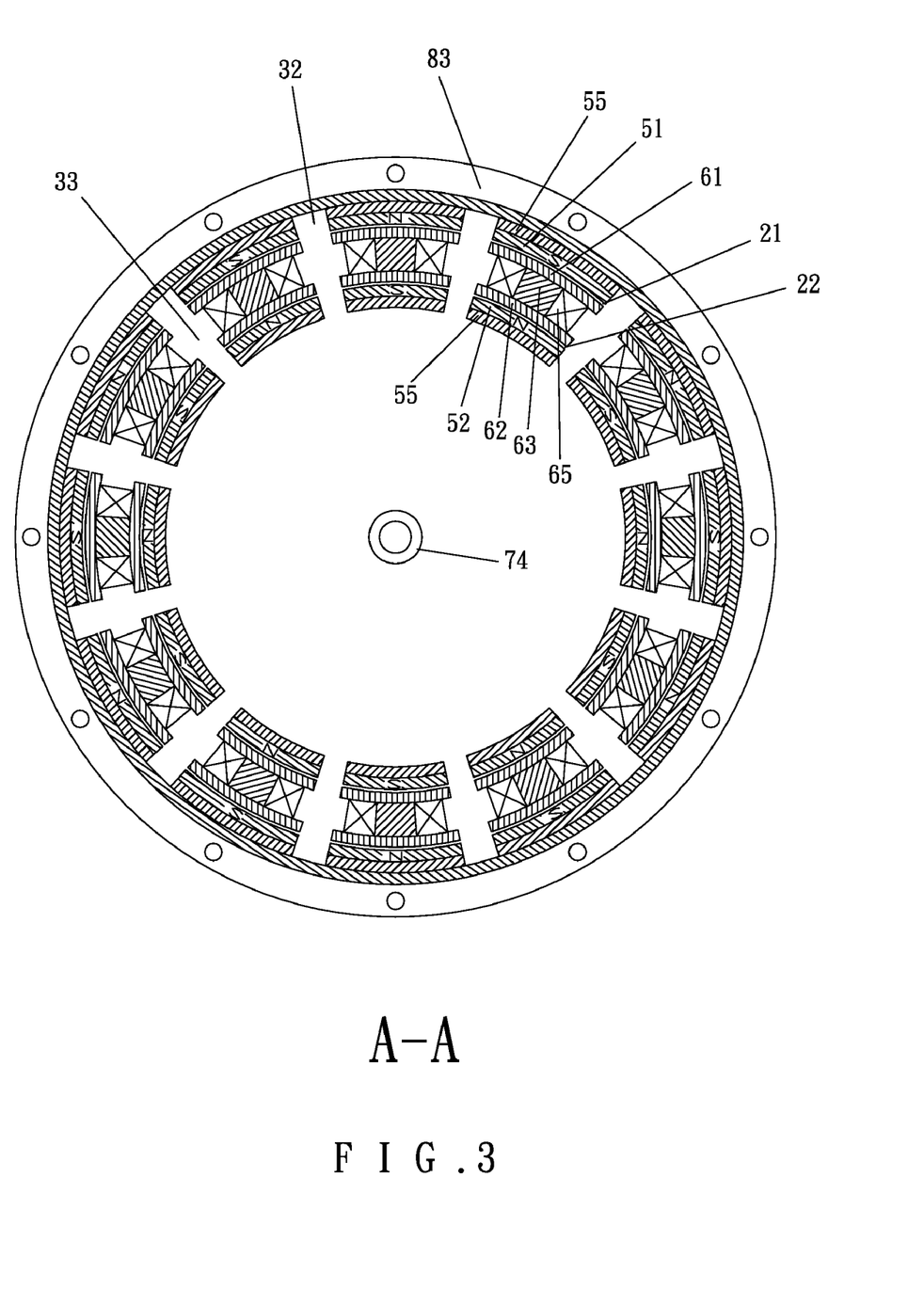
FIG. 3 is a cross section of the brushless electric machine taken along line A-A of FIG. 2.

FIG. 3 is a cross-sectional view taken along line A-A of FIG. 2, illustrating structure of the first embodiment of the brushless electric machine in accordance with the present invention. In the rotor outer ring 83, a permanent magnet 51, 52 is mounted to the inner face of each lateral wall of the U-shaped coupling seat 55 of each magnetic element, with a magnetic pole face of each permanent magnet 51, 52 facing an corresponding radial component air-gap. The magnetic pole face of each permanent magnet exhibits a single magnetic polarity that is opposite to that of the magnetic pole face of the other permanent magnet on the same magnet element. The magnetic elements are arranged along a circumferential direction about the revolving shaft 74 and successively alternate in magnetic polarities (N/S) to form a rotor wheel-shaped ring. Each electromagnetic member of the stator includes twin poles 61 and 62 connected via a ferromagnetic core segment 63, with a winding 65 formed on the core segment. The pole pair 61 and 62 of each of the plurality of electromagnetic members arranged along the circumferential direction about the revolving shaft to form a stator ring respectively face the magnetic poles of two permanent magnets 51 and 52 on the corresponding magnetic elements of the rotor through the radial component air-gaps 21 and 22, respectively. When the winding on an electromagnetic member is energized, the flux passes through the core segment 63, the pole pair 61 and 62, and the radial component air-gaps 21 and 22 between the stator and the rotor to interact with the two permanent magnets 51 and 52 of the corresponding magnetic elements of the rotor. Each of the permanent magnets 51 and 52 is a thin permanent dipole magnet. Each magnetic pole face of each permanent magnet exhibits a single magnetic polarity opposite to that of the opposite side of the permanent magnet. The gaps 32 between adjacent magnetic elements along the circumferential direction about the revolving shaft may not be identical to one another to allow easy coordination with the elements on the stator. Furthermore, the gaps 32 between adjacent electromagnetic members of the stator may not be identical to one another to allow easy coordination with the elements on the rotor. The torque pulsation of the brushless electric machine can be reduced to attain smooth operations through appropriate arrangement. The torque-producing flux can be concentrated by the structure shown in FIG. 3. The magnetic polarities N and S shown only serve for illustration of the magnetic polarities of the magnetic field created by the magnetic pole faces facing the air-gaps, not for restrictive purposes.

Figure 4:
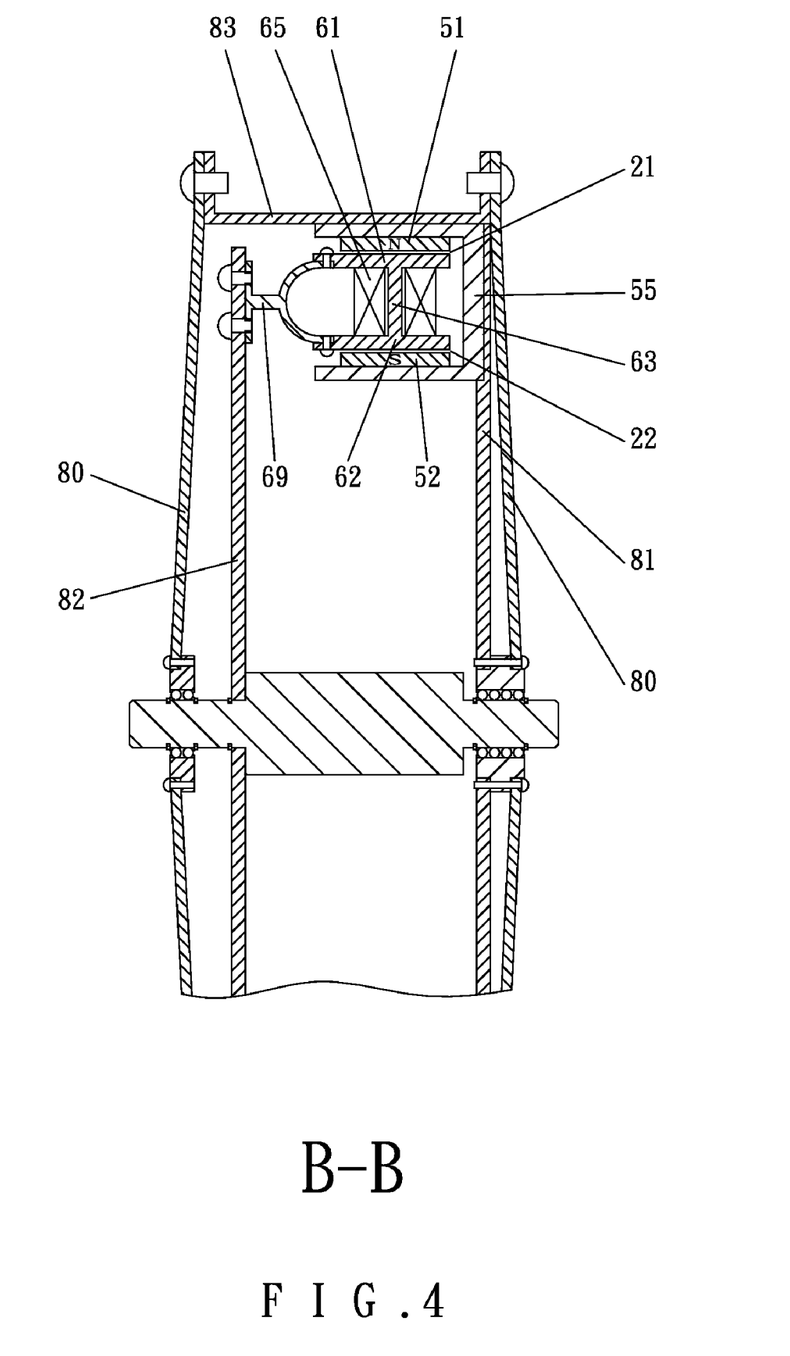
FIG. 4 shows detailed partial cross section of the brushless electric machine taken along line B-B of FIG. 2.

FIG. 4 shows detailed partial cross section of the brushless electric machine taken along line B-B of FIG. 2. As illustrated in FIG. 4, a rotor disc 80 is coupled to each of two sides of the rotor outer ring 83. Each magnetic element is coupled with the rotor fixing disc 81 by an associated coupling seat 55, with a permanent magnet 51, 52 mounted to the inner face of each lateral wall of the U-shaped coupling seat 55 of each magnetic element, and with a magnetic pole face of each permanent magnet 51, 52 facing an corresponding radial component air-gap. The coupling seat made of ferromagnetic material forms the yoke of the corresponding magnetic element to serve as a path for a return flux of the magnetic poles of two permanent magnets of the magnetic elements such that the flux concentrates at the ends of the permanent magnetic poles of the magnetic element. Each electromagnetic member of the stator includes a core segment 63 for coupling twin poles 61 and 62. The core segment 63 is made of ferromagnetic material such as Fe, SiFe, SiFeP, SiFeCo, etc. A winding 65 is formed on the core segment 63 of each electromagnetic member. Each electromagnetic member is mounted by a coupling seat 69 to the stator fixing disc 82 that is directly coupled with the revolving shaft. Two radial component air-gaps 21 and 22 are formed between the pole faces of two permanent magnets of each magnetic element of the rotor and the pole pair of the stator to separate the rotor from the stator. Referring to FIG. 4, the coupling seat 69 can be made of non-ferromagnetic material, such as aluminum or stainless steel such that an independent flux path is formed in each electromagnetic member of the stator. Since the electromagnetic members are ferromagnetically isolated from one another, more focused flux concentration can be obtained to provide better brushless electric machine characteristics through cooperation between the magnetic elements of the rotor and the electromagnetic members of the stator.

In the brushless electric machine, by placing a sensor or a commutator that cooperates with a brush in an appropriate location, the winding current of the respective electromagnetic members can be controlled at proper time to obtain smooth output. As an example, when the brushless electric machine is utilized as a motor, the relative position between the stator and the rotor detected by the sensor can be utilized to properly control energization of the winding of an electromagnetic member for magnetizing the corresponding electromagnetic members of the stator. Opposite magnetic polarities N and S are subsequently generated on the pole faces of the pole air of the electromagnetic member. Flux paths are generated by the energization of the winding across the air-gaps to produce magnetomotive force that interacts with the permanent magnets of the rotor to thereby drive the rotor to turn.

Energization control of the winding of a single electromagnetic member of the stator of the brushless electric machine will now be described as an example to explain the present invention. Due to mutual attraction between opposite magnetic polarities, when the north pole N of a permanent magnetic element of the rotor faces the south pole S of an electromagnetic member of the stator, the south pole S at the radial, opposite side of the magnetic element simultaneously faces the north pole N of the same electromagnetic member of the stator such that the permanent magnet poles of the rotor are attracted by the electromagnetic member of the stator. When the permanent magnetic poles of the rotor are attracted by and radially embrace the electromagnetic member of the stator, the current in the winding of the electromagnetic member of the stator is reversed to reverse the direction of the magnetic field of the pole pair of the electromagnetic member of the stator. At this time, the polarity of the magnetic field of the pole pair of the electromagnetic member of the stator is the same as and, thus, repulsed by that of the surrounding permanent magnetic pole of the rotor that attracts an adjacent permanent magnetic pole. The rotor is turned by repeating the above process.

Although energization control of the winding of a single electromagnetic member of the stator of the brushless electric machine is described above as an example, every other electromagnetic member of the stator can be deemed as an independent member whose position relative to the rotor can be detected by the sensor to decide energization control of its winding. Since each of the electromagnetic members is independent, they can be manufactured at the same time to allow easy but tight winding formation of the windings. Thus, the amount of copper wire for producing the windings can be reduced while improving the performance of the electric machine.

Figure 5:
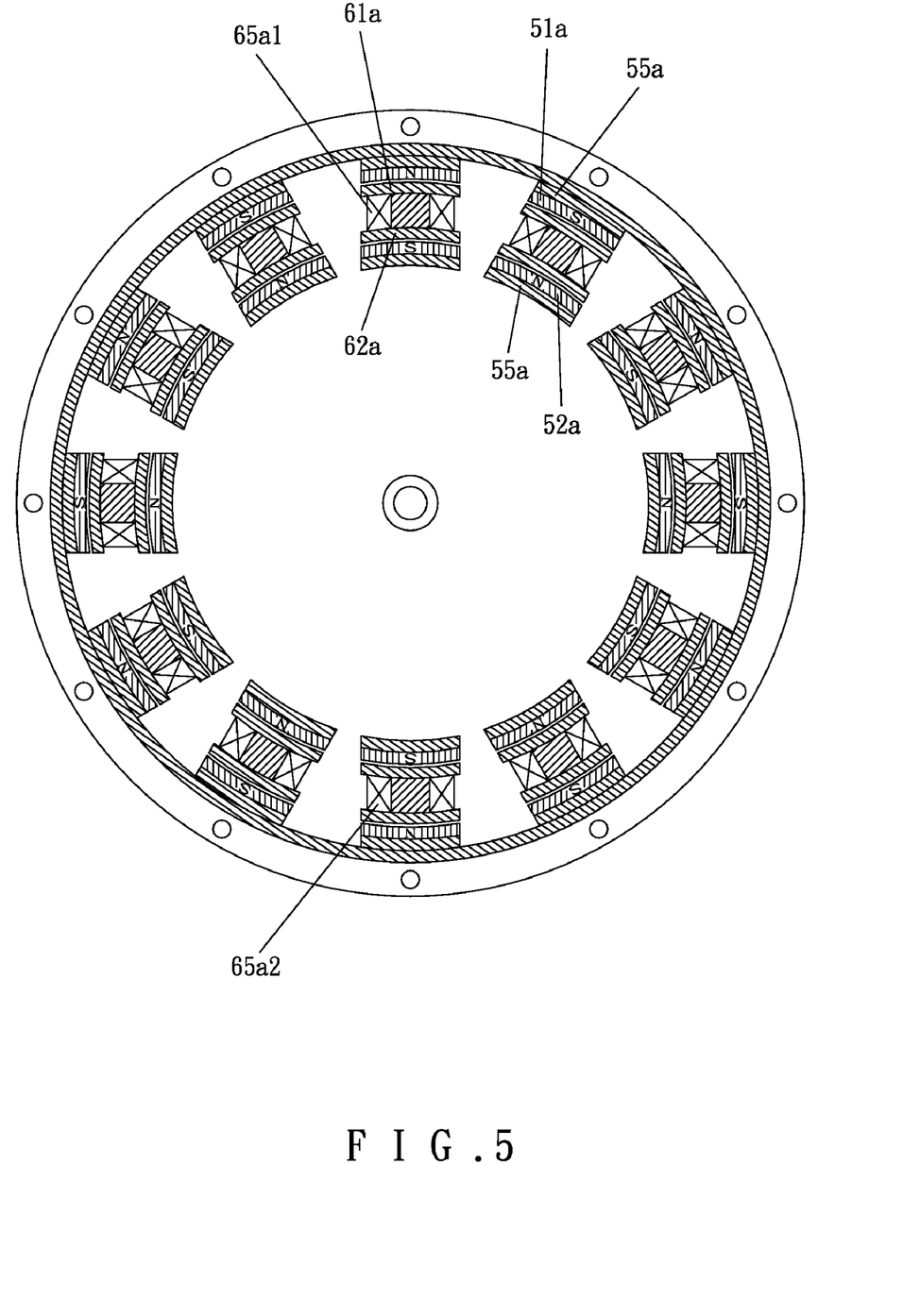
FIG. 5 is a variation of a cross section of FIG. 3, illustrating a second embodiment of the present invention.

FIG. 5 is a variation of a cross section of FIG. 3, illustrating a second embodiment of the present invention. In the illustrative figures of the present invention, wherein only the elements modified are labeled with different reference numbers to allow easy understanding of the modifications among the embodiments. Compared to the electric machine of FIG. 3, the brushless electric machine of FIG. 5 affects the maximum output but allows more uniform flux distribution of a pole pair of every electromagnetic member of the stator. The pole pair of each electromagnetic member in FIG. 3 is replaced by a pole pair 61*a* and 62*a* of the same pole face area in FIG. 5. In FIG. 5, to allow more matching with the flux distribution of two permanent magnet poles of each magnetic element of the rotor, the magnetic poles of the permanent magnets 51*a* and 52*a* of each magnetic element are modified to be more symmetrical whereas the coupling seat 55*a* is also modified responsive to the change of the permanent magnets 51*a* and 52*a*. Thus, the flux distribution between the pole pair of the electromagnetic member and the permanent magnetic poles of the magnetic element is more balanced. Although such a change may increase the torque pulsation during operation of the brushless electric machine, the bad effect resulting from the geometrical imbalance can be mitigated by geometrically balancing operation of the electric machine. For example, the windings 65a1 and 65a2 in FIG. 5 have a phase-angle difference of 180° to allow serial or parallel energization therebetween.

Figure 6:
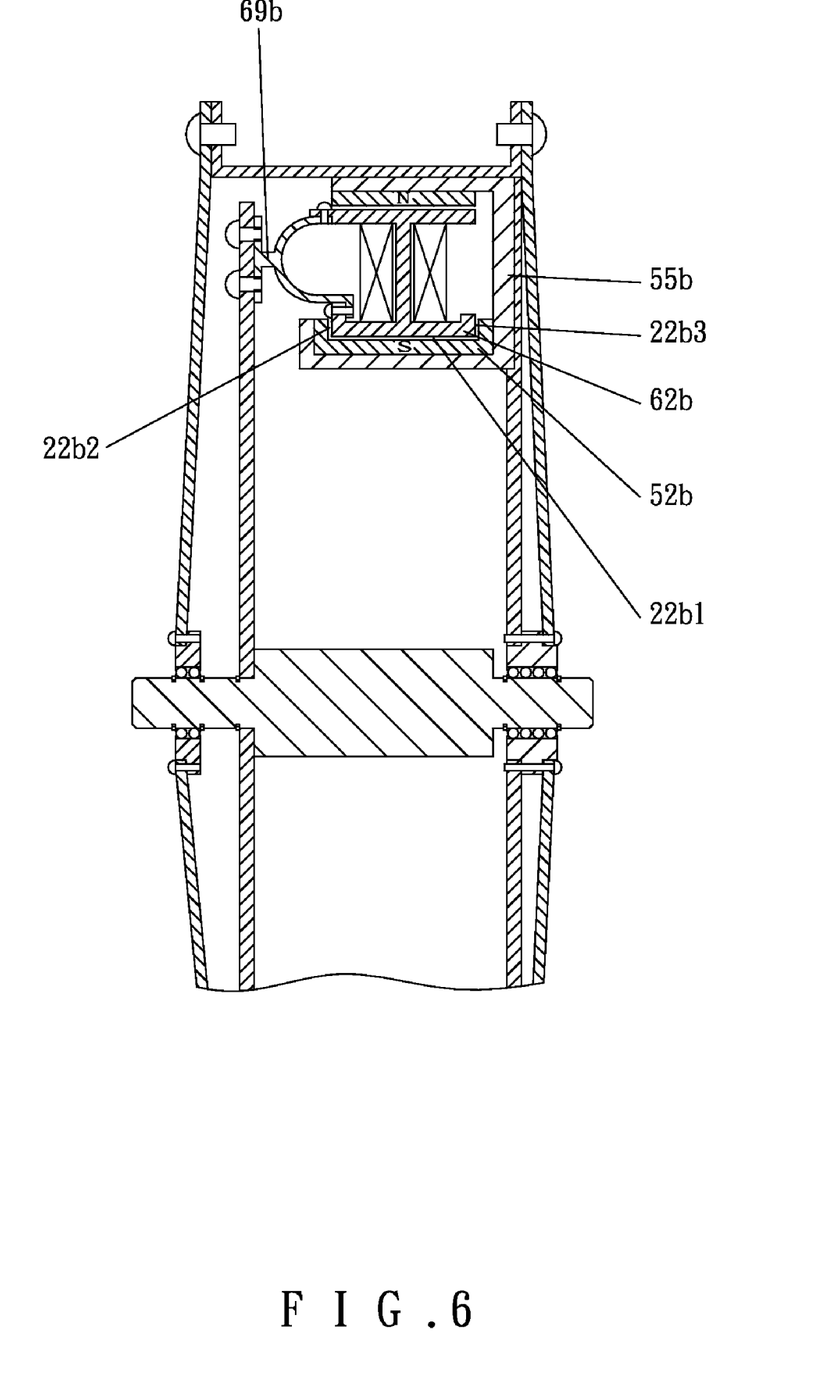
FIG. 6 is a variation of a cross section of FIG. 4, illustrating a third embodiment of the present invention.

FIG. 6 is a variation of a cross section of FIG. 4, illustrating a third embodiment of the present invention. Compared to the first embodiment, the third embodiment provides more balanced flux distribution between the pole pair of the electromagnetic member of the stator and the permanent magnetic poles of the magnetic element of the rotor without reducing the maximum output of the brushless electric machine. The radially inner pole 62 of the pole pair of each electromagnetic member and the radially inner pole 52 of the permanent magnetic poles of the corresponding magnetic elements in FIG. 4 are replaced by the radially inner pole 62b of an electromagnetic member having a U-shaped pole face and a radially inner permanent magnetic pole 52b of the magnetic element in FIG. 6. Nevertheless, the radially outer pole of the pole pair of each electromagnetic member and the radially outer permanent magnetic pole of the corresponding magnetic element in FIG. 6 are identical to those in FIG. 4 to maintain the zero-to-zero axially aligned axial component air-gaps, as illustrated in the figure. Still referring to FIG. 6, modified coupling seat 55b for the magnetic element and modified coupling seat 69b for the electromagnetic element are provided to coordinate with the modified electromagnetic member and the modified permanent magnetic pole of magnetic element. The permanent magnet 52b of the inner permanent magnetic pole of the magnetic element in FIG. 6 is a thin permanent dipole magnet having a U-shaped pole face. The U-shaped pole face of each permanent magnet only exhibits a single magnetic polarity opposite to that on the rear side of the U-shaped structure of the permanent magnet coupled to the inner face of the C-shaped coupling seat. The polarities N and S shown in the figure are for illustration only, not for restrictive purposes. The outer side of the U-shaped structure of the inner pole 62b of the electromagnetic member that has a U-shaped cross-section and that is in association with the permanent magnetic pole 52b of the magnetic element includes three pole faces, wherein the U-shaped pole face of the permanent magnetic pole 52b reacts with the U-shaped pole face of the corresponding inner pole 62b through the radial component air-gap 22b1 and the axial component air-gaps 22b2 and 22b3 therebetween. Since the number of the axial component air-gaps separating stator pole 62b from the corresponding rotor pole 52b is even, one-to-one axially aligned axial component air-gaps provide an additional air-gap surface area for enhancing flux concentration and improving balanced flux distribution between a pair of magnetic poles. Furthermore, the balancing effect in the axial direction does not cause adverse affect to the electric machine to further attain the need in geometrical balance.

Figure 7:
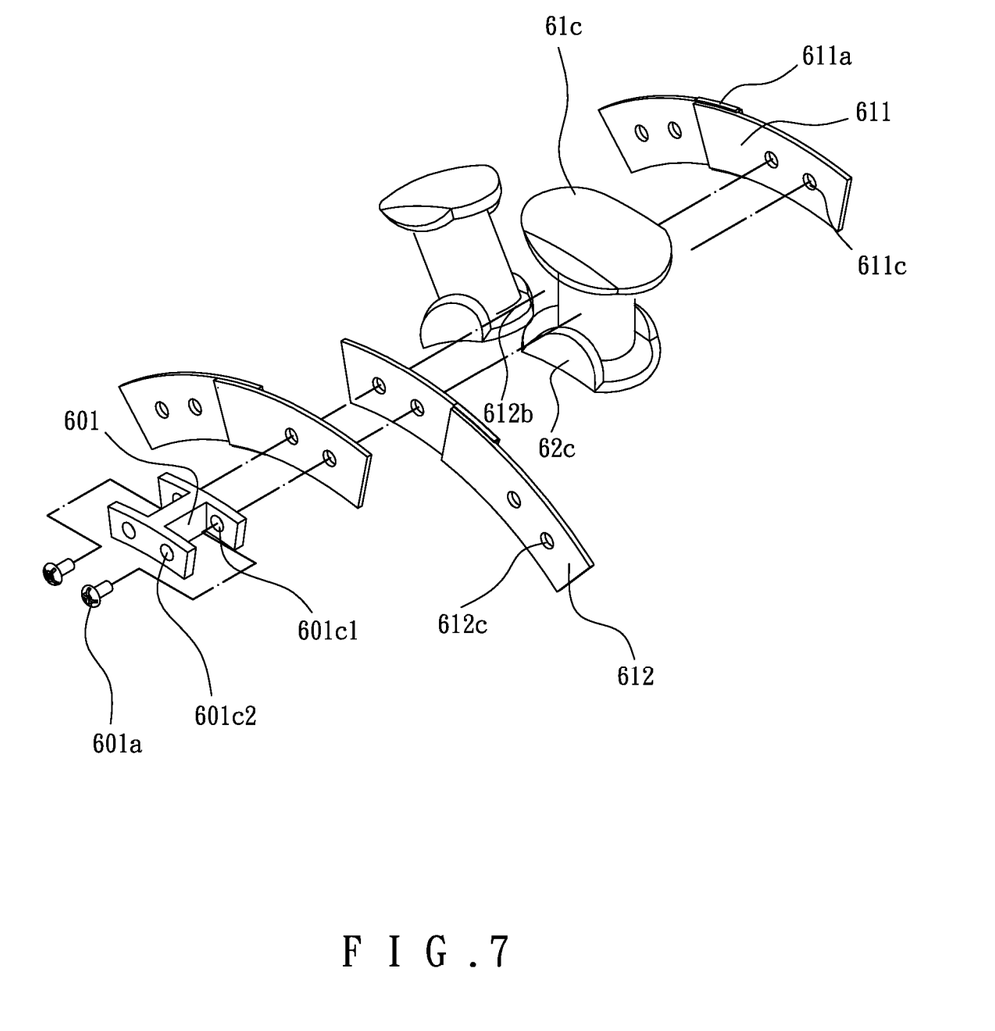
FIG. 7 is a variation of partial, exploded perspective view similar to a portion of a stator of the brushless electric machine of FIG. 1, illustrating a fourth embodiment of the present invention.

FIG. 7 is a variation of partial, exploded perspective view similar to a portion of a stator of the brushless electric machine of FIG. 1, illustrating a fourth embodiment of the present invention. Each U-shaped pole 61c, 62c of a pole pair of the electromagnetic member of the stator provides a relatively large air-gap surface area to reduce the volume of the brushless electric machine and to attain a more efficient brushless electric machine. The axially facing pole faces on two sides of each U-shaped pole are axially aligned. Each U-shaped pole 61c, 62c of the electromagnetic member of the stator includes four grooves. Two grooves 611b of each U-shaped pole are located on two opposite ends of a side of the U-shaped pole whereas the other two grooves 612b of the U-shaped pole are located on two opposite ends of the other side of the U-shaped pole. Fixing plates 611 and 612 made of non-ferromagnetic material each include a protrusion 611a, 612a on each of two radial sides thereof, with the protrusion tapering inward, and with the narrower inner portion of the protrusion being coupled with the body of the fixing plate. The body of each fixing plate 611, 612 may consist of two identical components each of which is an elongated strip concentric to the other. An end of one elongated strip is coupled with an end of the other elongated strip in an axial direction, with the protrusion 611a, 612a coupled with a radial side face of the joint area of the elongated strips. Holes 611c, 612c in the bodies allow mutual coupling with a pair of fixing plates adjacent to each other such that a plurality of fixing plates can be coupled together to form a circular ring. Two radial protrusions 611a on the fixing plates couple with two radial grooves 611b of the pole of the electromagnetic member of the stator whereas the radial protrusions 612a on the fixing plate couple with the radial grooves 612b of the pole of the electromagnetic member of the stator. The fixing plates 611 and 612 are substantially identical. By tight coupling between the grooves of the pole of the electromagnetic member and the protrusions of the fixing plates, a plurality of fixing plates made of non-ferromagnetic material adjoin one another to coordinate with a plurality of electromagnetic members arranged along the circumferential direction about the revolving shaft to form a stator wheel-shaped ring. As illustrated in the figure, the fixing post 601 of the stator has a function of coupling the stator wheel-shaped ring with the stator fixing disc. Holes 601c1 of the fixing post 601 are engaged with holes 612c in the fixing plate 612 by conventional ways of fixing, an illustrative example of which is fasteners 601a. Holes 601c2 in the fixing post allows coupling with the stator fixing disc. In practice, operation of the brushless electric machine would not be affected even though the fixing plates 611 are omitted.

Figure 8:
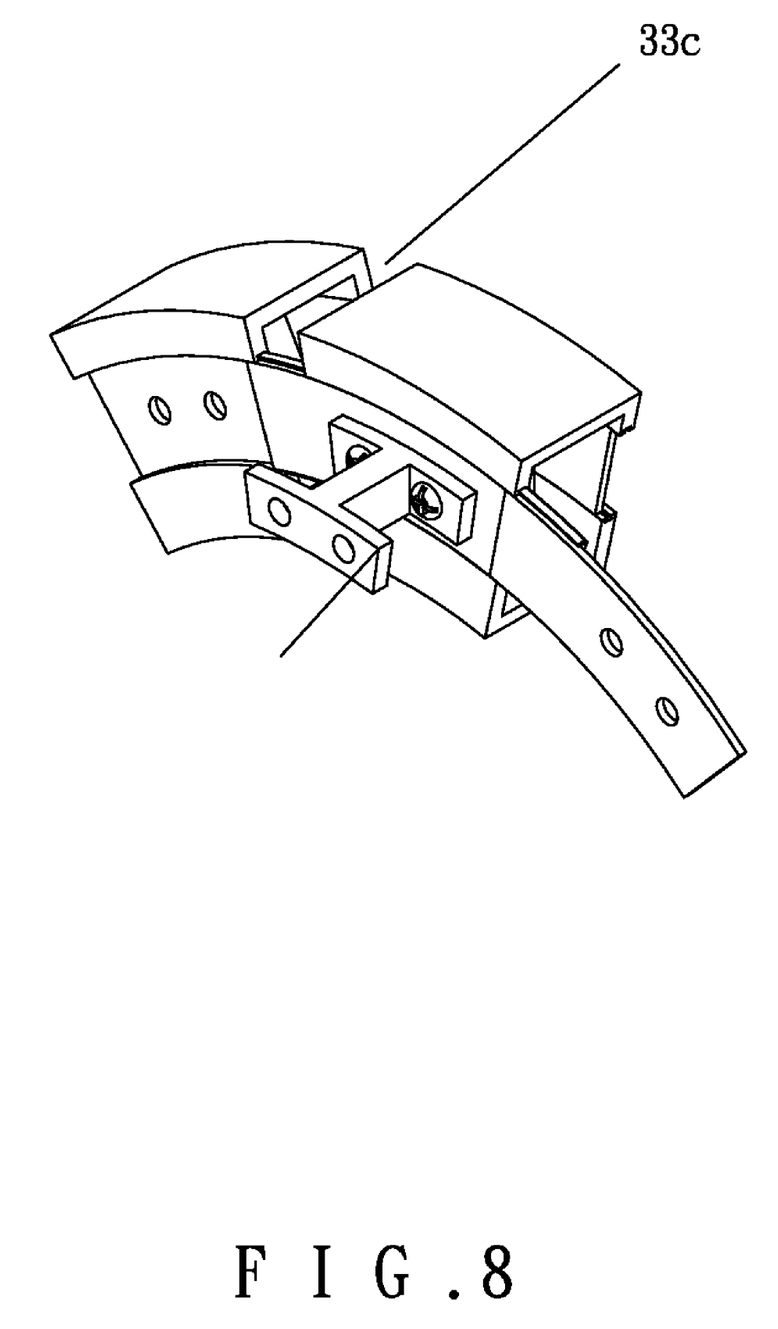
FIG. 8 is a perspective view illustrating a portion of a stator of the brushless electric machine of FIG. 7 after assembly.

FIG. 8 is a perspective view illustrating a portion of a stator of the brushless electric machine of FIG. 7 after assembly. Two electromagnetic members of the stator ring adjacent to each other are spaced by a gap 33c such that the electromagnetic members are not in ferromagnetic contact and, thus, magnetically isolated.

Figure 9:
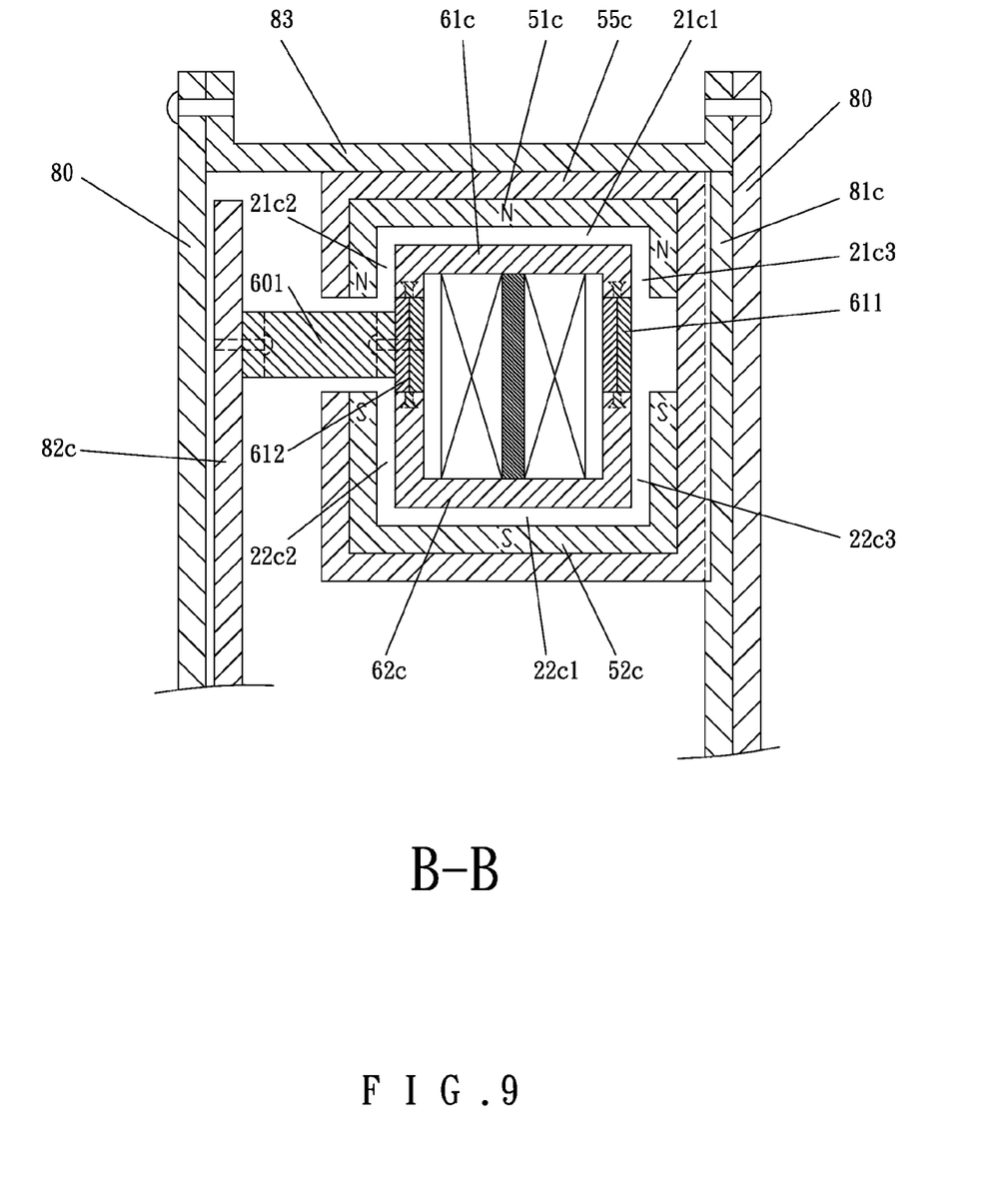
FIG. 9 is a cross section illustrating a portion of the fourth embodiment of the brushless electric machine in accordance with the present invention, with a portion of the stator of the brushless electric machine after assembly being shown in FIG. 7.

FIG. 9 is a cross section illustrating a portion of the fourth embodiment of the brushless electric machine in accordance with the present invention, with a portion of the stator of the brushless electric machine after assembly being shown in FIG. 7. A plurality of fixing plates 611 and 612 adjoin one another to coordinate with a plurality of electromagnetic members arranged along the circumferential direction about the revolving shaft to form a stator wheel-shaped ring through coupling between fixing posts 601 and the stator fixing disc 82c. To coordinate with the U-shaped pole 61c, 62c of the electromagnetic member of the stator, each magnetic element with permanent magnets includes a substantially C-shaped coupling seat 55c made of ferromagnetic material. A radial upper portion of an inner surface of the coupling seat is coupled with a rear surface of a U-shaped permanent magnet 51c whereas a radial lower portion of the inner surface of the same coupling seat is coupled with the other U-shaped permanent magnet 52c whose surface having an opposite magnetic polarity, thereby forming two magnetic poles with opposite magnetic polarities at their pole faces on the magnetic element. Two permanent magnets on each magnetic element are substantially spaced by the radial component air-gap. Each permanent magnet of each magnetic pole of the magnetic element is a thin permanent dipole magnet having a U-shaped pole face. The U-shaped pole face of each permanent magnet exhibits a single magnetic polarity opposite to that of the U-shaped rear surface of the permanent magnet mounted on the inner surface of the coupling seat. The rear side of the C-shaped coupling seat of each magnetic element is coupled with the rotor fixing disc 81c that is coupled with one of the rotor discs 80. The rotor outer ring 83 is engaged with the rotor discs at two sides. Thus, each permanent magnet pole of the magnetic element includes three pole faces of the same magnetic polarity in the magnetic field, a first one of which is generally parallel to the revolving shaft and has a pole face facing the radial component air-gap 21c1 (or 22c1), and the other two respectively face the axial component air-gaps 21c2 and 21c3 (or 22c2 and 22c3). The pole face of each magnetic pole of each magnetic element react with the corresponding pole face of the corresponding magnetic pole of the stator pole pair, with an air-gap formed therebetween. As illustrated in the figure, two magnetic poles of the pole pair of the electromagnetic member have approximately the same pole face area. Two permanent magnetic poles of the magnetic element have approximately the same pole face area. Furthermore, the number of the axial component air-gaps separating stator pole from the corresponding rotor pole is even, providing one-to-one axially aligned axial component air-gaps in the axial direction. When the ferromagnetic material is arranged appropriately, the pole face surface area of the pole pair of the stator, that is substantially the same as that of the electromagnetic member, does not have to be equal to the pole face surface area of the two magnetic poles that is substantially the same as identical pole face surface area of the magnetic element. Nevertheless, the pole face surface area of the pole pair of an electromagnetic member of the stator is substantially the same as the pole face surface area of two magnetic poles of an magnetic element of the rotor to provide more balanced flux distribution of twin poles of the electromagnetic member of the stator and the two permanent magnetic poles of the magnetic element of the rotor. Since the axially aligned balancing effect does not cause adverse affect to the electric machine, the need in the geometrical balance is further attained. A plurality of magnetic elements with permanent magnets are arranged along the circumferential direction about the revolving shaft to form a wheel-shaped ring, wherein the permanent magnets surrounding the revolving shaft along the circumferential direction successively alternate in polarities. The magnetic polarities N and S in the figure are for illustrating the polarity of the magnetic field of the magnetic pole face facing the air-gap, not for restrictive purposes.

In operation, the stator of FIG. 9 can be assembled with the rotor of FIG. 4, which is merely an example of various embodiments of the present invention. Although having adverse affect to the flux of the electric machine, such an assembly still obtains axially aligned axial component air-gaps while attaining useful operation. The stator pole includes a pole face facing the radial component air-gap as well as axially aligned pole faces facing the axial component air-gaps whereas the rotor pole only includes a pole face facing the radial component air-gap. As a result, the number of the axially aligned axial component air-gaps separating the stator pole and the corresponding rotor pole in the axial section is zero (zero-to-zero axially aligned axial component air-gaps).

Figure 10:
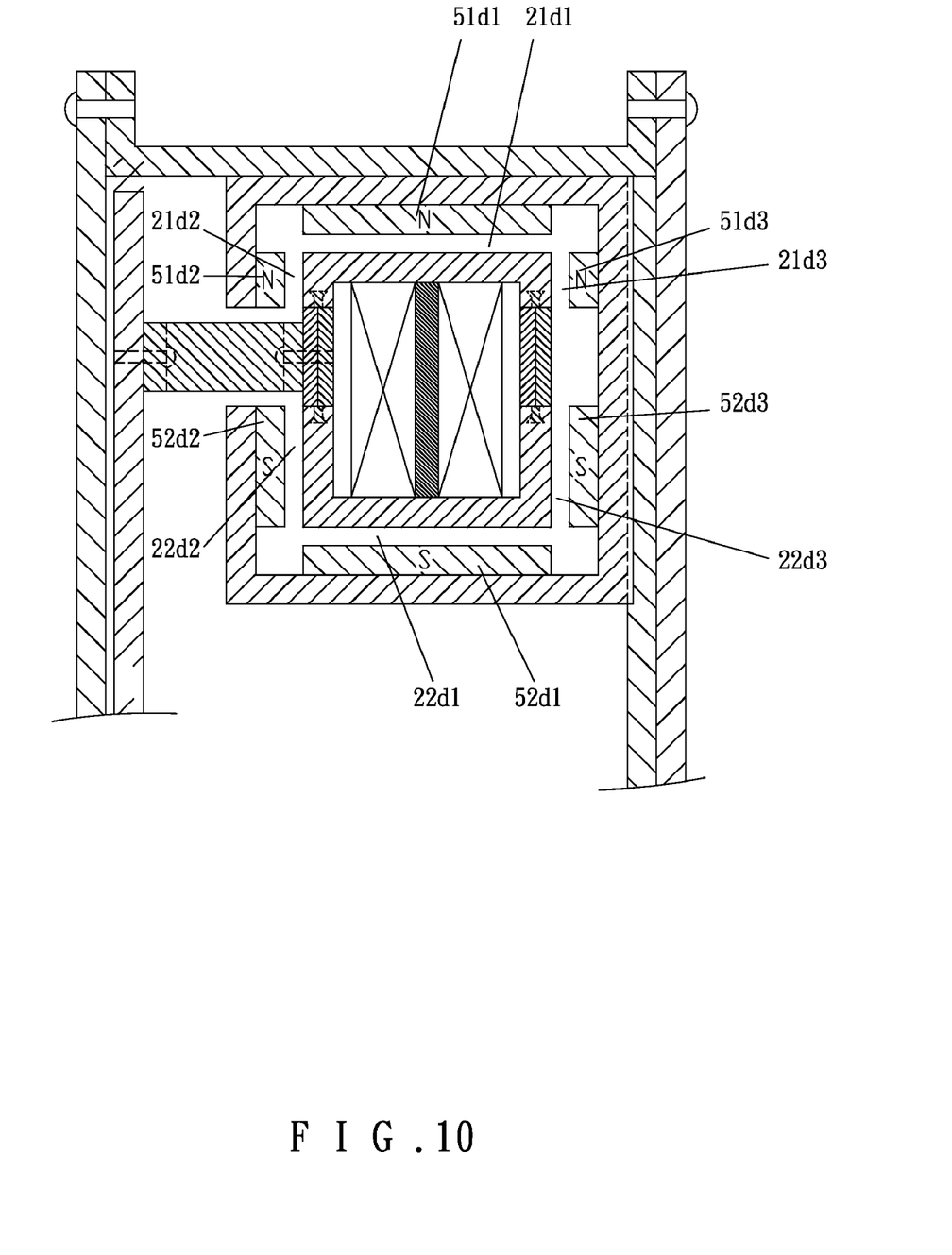
FIG. 10 is a variation of a cross section of FIG. 9, illustrating a fifth embodiment of the present invention.

FIG. 10 is a variation of a cross section of FIG. 9, illustrating a fifth embodiment of the present invention. The U-shaped permanent magnets 51c and 52c on the inner surface of the coupling seat of the magnetic element of FIG. 9 are replaced by three permanent magnets 51d1, 51d2, and 51d3; 52d1, 52d2, and 52d3 of FIG. 10. In this figure, the permanent magnets 51d1 and 51d2 are mounted on the inner surface of the coupling seat such that the magnetic pole faces respectively face the radial component air-gaps 21d1 and 22d1 whereas the permanent magnets 51d2, 51d3 and 52d2, 52d3 are mounted on the axial section of the inner surface of the C-shaped coupling seat such that the magnetic pole faces respectively face the associated axial component air-gaps 21d2, 21d3 and 22d2, 22d3. Each of three permanent magnets of each magnetic pole is a thin permanent dipole magnet and exhibits a single magnetic polarity opposite to that on the rear surface of the permanent magnet. Thus, three adjacent permanent magnet pole faces of a magnetic pole of the magnetic element have identical magnetic field polarity (such that the fluxes extending across the air-gaps assist each other) opposite to that of three adjacent permanent magnets of the other magnet pole of the same magnetic element. The magnetic polarities N and S in FIG. 10 are for illustrating the polarity of the magnetic field of the permanent magnetic pole, not for restrictive purposes.

Figure 11:
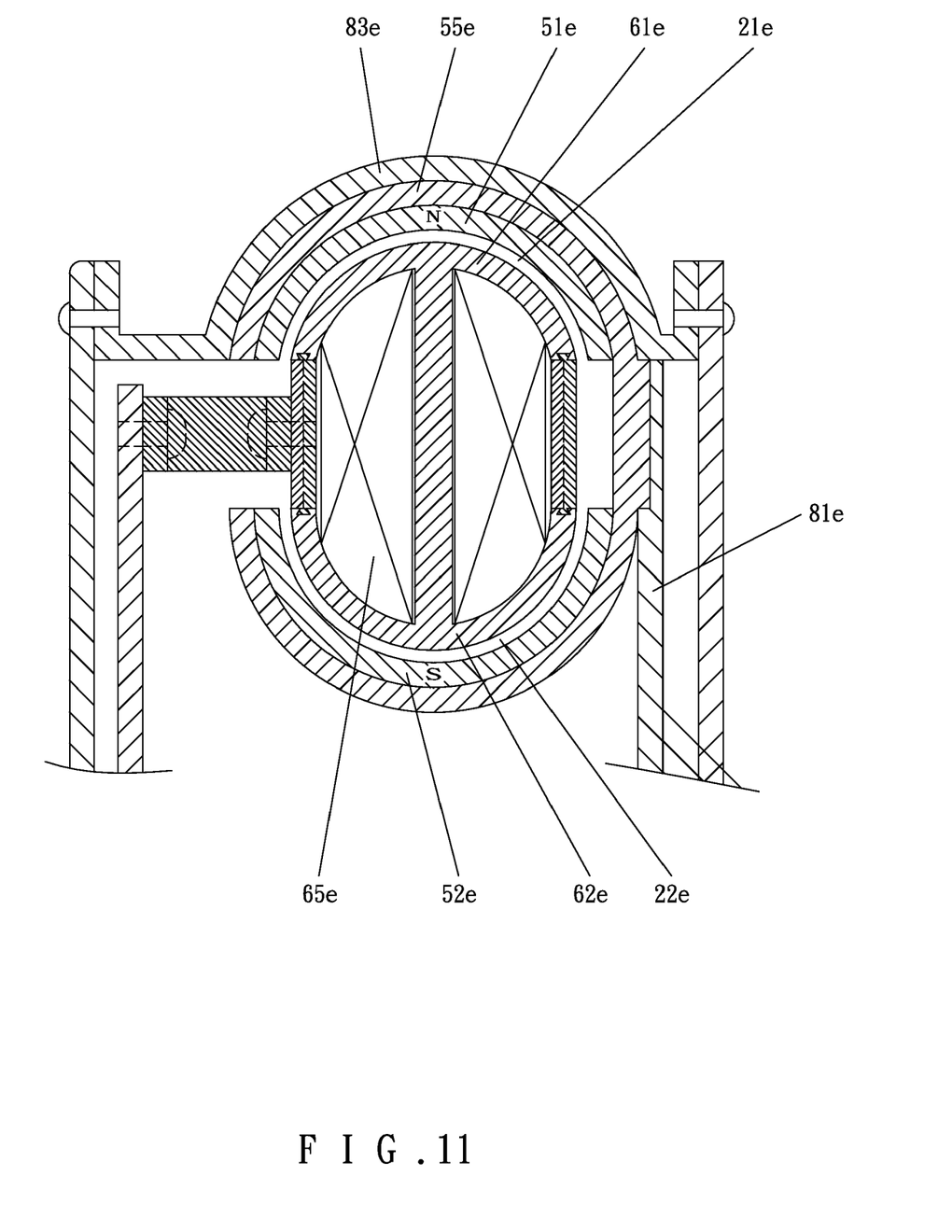
FIG. 11 is another variation of a cross section of FIG. 9, illustrating a six embodiment of the present invention.

FIG. 11 is another variation of a cross section of FIG. 9, illustrating a six embodiment of the present invention. The U-shaped permanent magnets 51c and 52c on the inner surface of the coupling seat of the magnetic element in FIG. 9 are replaced by permanent magnets 51e and 52e. As can be seen in this figure, to coordinate with this change, the permanent magnets 51e and 52e are mounted on the inner surface of the coupling seat 55e of the magnetic element, and the rear surface of the coupling seat of the magnetic element is coupled with the rotor fixing disc 81e, whereas the pole pair 61e, 62e of the electromagnetic member of the stator face the permanent magnets 51e, 52e of the magnetic element of the rotor through associated air-gaps 21e, 22e therebetween. Thus, two radial component air-gaps are formed between the stator and the rotor to separate the stator from the rotor, and axially aligned axial component air-gaps are formed between a stator pole and its corresponding rotor pole to separate the stator pole and the rotor pole. An example of a correspondingly modified winding 65e of the electromagnetic member in response to the change of the pole pair is shown in the figure.

In a seventh embodiment of the present invention, the rotor fixing disc and the rotor outer ring of the fourth embodiment can be used and made of non-ferromagnetic material such that two adjacent ones of the permanent magnets surrounding the revolving shaft along the circumferential direction are spaced by a gap without ferromagnetic contact. Thus, a smoother flux distribution is provided on the rotor magnetic pole, attaining concentration of flux, most efficient utilization of flux, and minimization of the transformer interference effect. Furthermore, adverse affect to the electric machine resulting from individual energization of a winding of a single electromagnetic member of the stator can be minimized through better spatial geometrical balance of the magnetic elements of the rotor and the electromagnetic members of the stator, allowing more delicate output control of the electric machine and providing safe, flexible operating characteristics.

Although specific numbers of the magnetic elements of the rotor and the corresponding electromagnetic members of the stator are mentioned, the numbers of the corresponding electromagnetic members of the stator and the magnetic elements of the rotor and can be identical or not the same to meet the need of designs. Each gap between adjacent magnets of the magnetic elements of the rotor arranged along the circumferential direction about the revolving shaft could be different from each other. Furthermore, each gap used to magnetically isolated from adjacent electromagnetic members of the stator arranged along the circumferential direction about the revolving shaft may not be the same from each other. The torque pulsation during operation of the brushless electric machine can be reduced through appropriate arrangement of the gaps.

In all of the embodiments above, the coupling seats of the magnetic elements of the rotor can be made of non-ferromagnetic material. Although adverse affect to concentration of flux occurs, operation control of the brushless electric machine remains unchanged. Useful operation of brushless electric machine can still be attained.

As for the stator or the rotor, the components of any one of them can be manufactured with specific size specifications to simplify production. Thus, the brushless electric machine of the present invention provides larger output and higher power and allows easy manufacture.

Although the embodiments of the present invention set forth above include mounting electromagnet members with windings on the stator and mounting magnetic elements on the rotor, these components can be mounted reversely such that the magnetic elements are carried by the stator whereas the windings with protruding poles are located on the rotor. Moreover, in practice, a plurality of brushless electric machines of the present invention can be axially expanded to increase output. Furthermore, in a case flattening of electric machine and larger output as well as smoother operation are required, a plurality of brushless electric machines can be cascaded in the radial direction, with the cascaded brushless electric machine having their respective rotor wheel-shaped rings and their respective stator wheel-shaped rings arranged along the respective circumferential directions so that the cascaded brushless electric machine are moved through a corresponding angle in the respective circumferential directions. Thus, no additional sensors are required for respectively energizing the windings of the electromagnetic members of the stator at appropriate time for attaining required operation.

The above embodiments are merely examples of the present invention; however, the present invention is not limited by these embodiments. Although the illustration of the present invention shows a stator surrounded by a rotor, the structure can be arranged in a reverse manner such that the rotor is surrounded by the stator. In this disclosure there are shown and described only preferred embodiments of the present invention and but a few examples of its versatility. It can be appreciated that the present invention is capable of use in various other combinations and environments and is capable of changes or modifications within the scope of the inventive concept as expressed herein.

What is claimed is:

1. A brushless electric machine comprising:
a rotor including a plurality of magnetic elements containing permanent magnet arranged along a circumferential direction about a revolving shaft to form a rotor wheel-shaped ring, with each said magnetic element having respectively two magnetic poles; and
a stator including a plurality of magnetically isolated electromagnetic members coaxially arranged around the revolving shaft to form a stator wheel-shaped ring, each said electromagnetic member having twin poles,
wherein each pole of the twin poles of the electromagnetic members of the stator corresponds to one magnetic pole of the magnetic poles of the magnetic elements of the rotor respectively,
wherein two radial component air-gaps are arranged between the stator and the rotor to separate the stator from the rotor, wherein axially aligned axial component air-gaps are arranged between the stator pole and the corresponding rotor pole to separate the stator pole from the corresponding rotor pole, and
wherein stator wheel-shaped ring is partly surrounded by the rotor wheel-shaped ring.

2. The brushless electric machine of claim 1, wherein the axially aligned axial component air-gaps are arranged between the stator pole and the corresponding rotor pole to separate the stator pole from the corresponding rotor pole, and wherein the number of the axially aligned axial component air-gaps between the stator pole and the rotor pole is zero.

3. The brushless electric machine of claim 2, wherein the pole face of the stator pole and the pole face of the corresponding rotor pole at the axial component air-gaps do not coexist.

4. The brushless electric machine of claim 1, wherein the amount of the axially aligned axial component air-gaps defined between the stator pole and the corresponding rotor pole is even.

5. The brushless electric machine of claim 4, wherein the pole face amount of the stator pole and the corresponding rotor pole at the axial component air-gaps are same.

6. The brushless electric machine of claim 1, wherein said twin poles of each said electromagnetic member of the stator is connected by a ferromagnetic core segment, with a winding formed on the core segment, with the winding, when energized with current, creating opposite magnetic polarities on respective pole faces of said twin poles of each said electromagnetic member of the stator, with said pole faces of each said pole having the same magnetic polarity, and with the magnetic polarities of said pole faces of said twin poles being reversed when the current passes the winding in a reverse direction.

7. The brushless electric machine of claim 6, wherein the stator has a non-ferromagnetic support structure, and wherein each said electromagnetic member of the stator is fixed independently by said non-ferromagnetic support structure to the stator such that said electromagnetic members of the stator have no ferromagnetic contact therebetween.

8. The brushless electric machine of claim 6, wherein the pole face of each of the two magnetic poles of each said magnetic element of the rotor exhibits a single magnetic polarity opposite to that of the other pole of said two magnetic poles.

9. The brushless electric machine of claim 8, wherein each said magnetic element includes a coupling seat made of ferromagnetic material, with the plurality of permanent magnets mounted to an inner surface of each said magnetic element to form the two magnetic poles of the magnetic element, and with a surface of each said permanent magnet facing the air-gap exhibiting a single magnetic polarity opposite to that of a rear surface of the permanent magnet mounted to the inner surface of the coupling seat of said magnetic element.

10. The brushless electric machine of claim 6, wherein the plurality of permanent magnets of the rotor arranged along the circumferential direction about the revolving shaft successively alternate in magnetic polarities (N/S) along the circumferential direction about the revolving shaft.

11. The brushless electric machine of claim 6, wherein one of said twin poles of each said electromagnetic member of the stator which said pole face facing component air gaps amount are three, and wherein one of said three component air-gaps is radial component air-gap, and the others are axial component air-gaps.

12. The brushless electric machine of claim 11, wherein each pole of said twin poles of each said electromagnetic member of the stator having three component air-gaps has a substantially U-shaped cross section and includes three pole faces, with a bottom pole face of the three pole faces facing the radial component air-gap, with the two radial component air-gaps between the rotor and the stator being located on opposite sides of the stator in the radial direction, and with the other two pole faces facing the respective axial component air-gaps.

13. The brushless electric machine of claim 9, wherein one of said two magnetic poles of said magnetic elements of the rotor which said pole face facing component air-gaps amount are three, and wherein one of said three component air-gaps is radial component air-gap, and the others are axial component air-gaps.

14. The brushless electric machine of claim 13, wherein each said magnetic element includes a C-shaped coupling seat made of ferromagnetic material, with the plurality of permanent magnets mounted to an inner surface of each said magnetic element to form the two magnetic poles of the magnetic element, and each said magnetic pole of said magnetic element having separately three pole faces having identical magnetic polarity, with a first of the three pole faces parallel to the revolving shaft facing one of the radial component air-gaps, and with the other two pole faces facing the respective axial component air-gaps.

15. The brushless electric machine of claim 14, wherein the permanent magnet of each magnetic poles of said magnetic element has a substantially U-shaped cross section to form three pole faces of the magnetic pole, with a bottom pole face of each said U-shaped cross section with said three pole face parallel to the revolving shaft.

16. The brushless electric machine of claim 9, wherein the permanent magnets on the two magnetic poles of each said magnetic element are substantially separated by radial gaps from each other.

17. The brushless electric machine of claim 10, wherein adjacent said permanent magnets arranged along the circumferential direction about the revolving shaft are spaced by one of the gaps from each other.

18. The brushless electric machine of claim 17, wherein adjacent said permanent magnets along the circumferential direction about the revolving shaft are spaced by one of the gaps and have no ferromagnetic contact from each other.

19. The brushless electric machine of claim 9, wherein said coupling seat of each said magnetic element of said rotor is made of non-ferromagnetic material.

\* \* \* \* \*